(12) United States Patent
Gerlinger

(10) Patent No.: US 12,043,001 B2
(45) Date of Patent: Jul. 23, 2024

(54) METHOD OF MANUFACTURING A FOIL TAPE AND FOIL TAPE

(71) Applicant: SwissChem AG, Ruethi (CH)

(72) Inventor: Eckhart Gerlinger, Ruethi (CH)

(73) Assignee: SWISSCHEM AG, Ruethi (CH)

( * ) Notice: Subject to any disclaimer, the term of this patent is extended or adjusted under 35 U.S.C. 154(b) by 95 days.

(21) Appl. No.: 17/450,095

(22) Filed: Oct. 6, 2021

(65) Prior Publication Data

US 2022/0134682 A1 May 5, 2022

(30) Foreign Application Priority Data

Oct. 6, 2020 (DE) .................... 10 2020 126 123.3

(51) Int. Cl.
| | |
|---|---|
| C09J 7/21 | (2018.01) |
| B29C 65/08 | (2006.01) |
| B29C 65/48 | (2006.01) |
| B29C 65/78 | (2006.01) |
| B32B 3/04 | (2006.01) |
| C09J 7/22 | (2018.01) |
| E04B 1/68 | (2006.01) |
| B29L 7/00 | (2006.01) |

(52) U.S. Cl.
CPC ........ *B29C 65/7832* (2013.01); *B29C 65/087* (2013.01); *B29C 65/48* (2013.01); *B32B 3/04* (2013.01); *C09J 7/21* (2018.01); *C09J 7/22* (2018.01); *E04B 1/68* (2013.01); *B29K 2995/0068* (2013.01); *B29L 2007/007* (2013.01); *C09J 2203/346* (2020.08); *Y10T 156/1049* (2015.01)

(58) Field of Classification Search
CPC ................. B32B 3/04; C09J 2203/346; Y10T 156/1051; Y10T 156/1049; Y10T 156/1015

USPC ........................................ 156/204, 226, 227
See application file for complete search history.

(56) References Cited

U.S. PATENT DOCUMENTS

2005/0058798 A1* 3/2005 Sieber ...................... E06B 1/62
428/40.1

FOREIGN PATENT DOCUMENTS

| DE | 10337880 B3 | 12/2004 |
|---|---|---|
| DE | 10 2008 037 292 A1 | 2/2010 |

(Continued)

OTHER PUBLICATIONS

European Search Report dated on Feb. 22, 2022, from European Application No. EP 21 20 1273, filed on Oct. 26, 2021. 5 pages.

*Primary Examiner* — Scott W Dodds
(74) *Attorney, Agent, or Firm* — HoustonHogle LLP

(57) ABSTRACT

The invention relates to a foil tape (10) for sealing joints between structural elements (30, 31) which are joined to one another, for example in house-building between masonry and a door or window jamb, wherein the foil tape (10) has a functional membrane (1), a textile (4) joined, preferably all-over, to the functional membrane (1) on a top side or an underside, and at least in certain areas an adhesive layer (2) applied in certain areas to that side of the membrane (1) which is averted from the textile (4), wherein the foil tape (10) is folded to produce a folded body (20), so that sections of the textile (4) lie on top of one another at least in certain areas, the sections of the textile (4) lying on top of one another being welded to one another partially and in particular in a punctiform pattern by supplying energy to the folded body (20).

15 Claims, 5 Drawing Sheets

(56) References Cited

FOREIGN PATENT DOCUMENTS

Figure 1A:
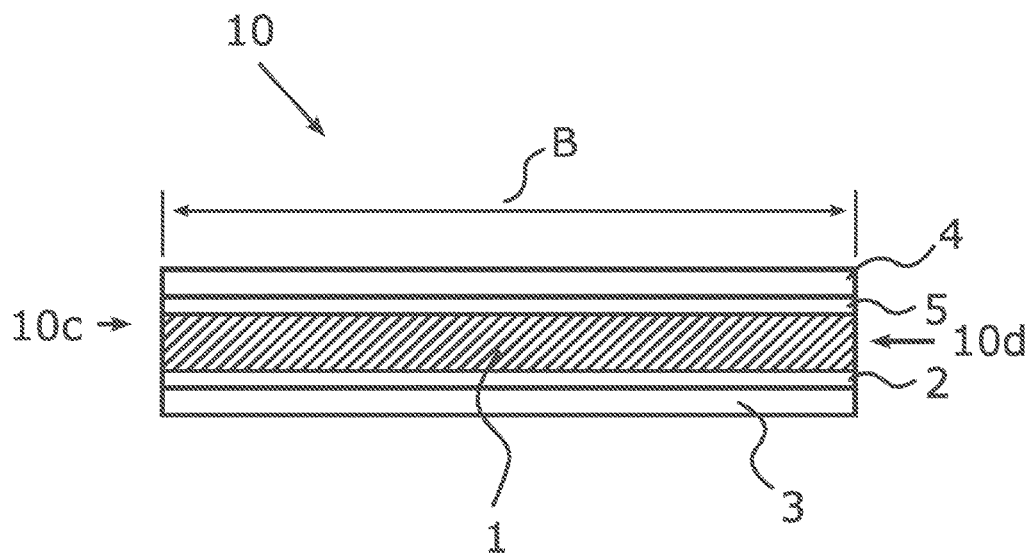

| | | |
|---|---|---|
| DE | 10 2010 054 110 A1 | 6/2011 |
| EP | 2 692 959 B1 | 4/2016 |
| EP | 2 058 466 B1 | 10/2016 |
| WO | WO 9633321 A1 | 10/1996 |
| WO | WO 9948618 A1 | 9/1999 |
| WO | WO 2010/017947 A2 | 2/2010 |

\* cited by examiner

METHOD OF MANUFACTURING A FOIL TAPE AND FOIL TAPE

RELATED APPLICATIONS

This application claims priority to German Application 10 2020 126 123.3, filed on Oct. 6, 2020, which is incorporated herein by reference in its entirety.

The invention relates to a method of manufacturing a foil tape and to such a foil tape.

Foil tapes, which can also be described as joint tapes, are used for sealing joints between structural elements that are joined to one another. The structural elements may be structural elements of house-building, and the joints may be joints between masonry and a door or window jamb. The foil tape comprises a functional membrane, a non-woven fabric joined, preferably all-over, to a top side or an underside of the membrane, at least in certain areas an adhesive layer applied to that side of the membrane which is averted from the non-woven fabric at least in certain areas.

Foil tapes for sealing joints between joined building components are known, being used in the construction of buildings in particular. The joints may for example be joints between masonry and the jamb of a window or door. The known foil tapes are usually built up from several layers, these being a membrane with a variable $S_{dd}$ value and at least one adhesive layer in a region on a top side of the membrane, with which they can be joined to one of the building components or to both building components forming the joint. Foil tapes are used both at the exterior of a building, e.g. for joining façade elements or for sealing the outside of windows or doors, and in the interior for sealing the inside of windows or doors.

From EP 2 058 466 B1, a window joining tape is known which is used for sealing a continuous joint between the edge of a building opening and a window frame. The window joining tape comprises two zones of a planar material and at least three adhesive zones across the width of the tape. The three adhesive zones join the tape permanently to the window frame and to that edge of the building opening which faces the interior of the building. Depending on its liquid content, the planar material of the two zones acts in a diffusion-open to diffusion-impeding manner.

EP 2 692 959 B1 relates to a foil tape for sealing joints between joined structural elements in house-building. The foil tape comprises a membrane including a humidity-variable polymer film whose water vapor diffusion coefficient varies with the surrounding atmospheric humidity. The foil tape is positively stretchable in the transverse direction.

Such foil tapes have a membrane which is usually formed from a polymer material. Such membranes or foils are known to the expert, for example from DE 10 2010 054 110 A1, from WO9633321 A1, from DE 10 2008 037 292 A1 and WO 2010/017947 A2.

Known joint tapes are provided in reel form for storage and transport. The handling of the known joint tapes poses a problem in the installation process, because as the joint tape is applied at one end, the rest of the joint tape hangs about and can only be controlled with major difficulty. This makes the exact positioning of the joint tape difficult and can lead to more time being required when installing the joint tape. This added time increases the costs for the builder and reduces the profit of the executant.

There is therefore a need for a foil or joint tape that allows the tape to be installed more safely and quickly than is the case with known tapes.

The invention is therefore based on the problem of providing a method of manufacturing a foil tape and a foil tape which can be processed safely and quickly on site.

This problem is solved by a method of manufacturing a foil tape with the features of claim 1 and by a foil tape with the features of claim 10. The claims depending on claim 1 and/or claim 10 disclose further features with which the method or the subjects matter can be developed further to advantage.

One aspect of the invention relates to a method of manufacturing a foil tape for sealing joints between two structural elements, for example in house-building between masonry and a window or doorjamb, the method comprising the steps of:

(a) the provision of a tape-like membrane or the cutting of the membrane to size;
(b) the provision of a tape-like textile or the cutting of the textile to size;
(c) the joining of the textile to a top side or underside of the membrane;
(d) the application of an adhesive layer to at least certain areas of that side of the membrane which is averted from the textile;
(e) the folding of the foil tape along a longitudinal axis to form a folded body, so that the adhesive layer forms in certain areas an outside of the folded body on a top side and/or an underside of the folded body and sections of the textile lie on top of one another in the interior of the folded body at least in certain areas;
(f) the joining of the sections of the textile lying on top of one another in certain areas, so that the sections of the textile lying on top of one another are joined partially and in particular in a punctiform pattern.

Certain areas of the textile section can for example be joined by supplying energy to certain areas of the folded body, so that the sections of the textile lying on top of one another are welded partially and in particular in a punctiform pattern.

It has been found that, by supplying energy to certain areas, the sections of the textile lying on top of one another are welded partially and in particular in a punctiform manner. The phrase "supplying energy to certain areas" means that energy is only supplied to a part of the sections lying on top of one another. This forms a welded joint which partially joins the sections lying on top of one another.

Alternatively the joining of the textile sections in certain areas can be achieved by supplying adhesive to certain areas, so that the sections of the textile lying on top of one another are bonded partially and in particular in a punctiform manner.

By the partial or welded joint produced in this way, the folded state of the foil tape is securely maintained, and the joint can be undone easily. As a result the foil tape produced in this way can be installed easily, as will be explained in greater detail below.

The welded joint is preferably a spot-welded joint with several welding spots arranged at a distance from one another. It can also be a broken thin weld seam, however. The spot-welded joint is preferred, however, as will be explained in greater detail below.

The textile can be a woven fabric, a knitted fabric or a non-woven fabric. If the textile is a non-woven fabric, the joining of the fabric sections by welding is preferred. It has been found that non-woven fabrics can be welded particularly efficiently and reliably.

The dimensions of the textile substantially correspond to the dimensions of the membrane. The textile can be permanently joined to the membrane, for example by bonding. The membrane can be covered by the textile only on the top side or the underside, of both on the top side and on the underside. In this the textile covering the top side can be the same material as the textile covering the underside. Different textiles can also be provided, however. Polyester, polypropylene or polyamide are particularly suitable textile or non-woven fabric materials. The non-woven fabric can be a needle felt, a water structure fabric, a spunbond or another non-woven fabric or textile suitable for the purpose.

The adhesive layer can be a self-adhesive layer, i.e. an adhesive which maintains its adhesive properties at normal ambient temperature at least substantially for a longer time, e.g. days, weeks or months. Such an adhesive can have an expiry date from which it must no longer be used. The adhesive layer can, however, also be an adhesive with adhesive properties that have to be activated first. The adhesive preferably forms a self-adhesive layer, a self-adhesive area or a self-adhesive strip.

If the adhesive layer is a self-adhesive layer, it can be covered with a cover foil at least in certain areas to protect the adhesive layer against drying-out or contamination and/or unwanted adhesion of the foil tape to an object during storage and transport. In addition the unrolling of the foil tape from a reel can be made easier in this way.

The foil tape is usually a strip-shaped flexible flat body with a defined length and a defined width, the length being a multiple of the width. If the foil tape is folded on at least one longitudinal side, this means that the fold line extends substantially parallel to a central longitudinal line of the tape.

In the welding process only the two sections of the textile lying on top of one another are joined. The material of all other layers of the folded body is possibly heated locally in the welding process, but not enough to induce a material bond with an adjoining layer.

With the partial welding of the sections of the textile lying on top of one another, circular dot-shaped, linear or cruciform welding spots can be obtained. The welding spots are preferably spaced evenly along a straight line. They may also be arranged in a predetermined random pattern, however. The weld can also be formed as a continuous thin line. Finally, two or more welding spots can be arranged next to one another transversely to the longitudinal axis of the tape, for example on a line or offset relative to one another. A welding spot can be circular, triangular, polygonal, for example square, quadrangular, hexagonal, cruciform, annular or annular segment-shaped or have any shape.

The distance between two welding spots located consecutively in the longitudinal direction of the tape can be at least 10 mm, preferably at least 15 mm and particularly preferably at least 20 mm. The maximum distance between two consecutive welding spots can be 50 mm, preferably 30 mm and particularly preferably 20 mm. In this the distance denotes the distance between the centers of two welding spots adjoining each other in the longitudinal direction of the tape. Distances of less than 10 mm or more than 50 mm between the welding spots are covered by the invention as well but are preferred less. The distance between two welding spots is preferably chosen such that a finger can be inserted into the area between said welding spots in order to undo the welding spots and thus the fold.

In the welding process energy can be supplied via a plate-shaped body or via an assembly of rollers. The assembly of rollers preferably comprises a first roller and a second roller which are arranged parallel on top of each other in such a way that they form a roller gap in between. Several rollers arranged consecutively can also be provided, however, in order to guide the foil tape along a defined route. These can be individual rollers or several pairs of rollers, with two rollers arranged parallel on top of each other in each case, so that they form a roller gap in between.

The folded body is preferably guided through the roller gap. The first and the second roller or at least one of the rollers can be wheel-shaped, i.e. have a diameter greater by a multiple than a width in the direction of the axis of rotation of the roller. The first and/or the second roller can have a plurality of nubs projecting from the roller surface, which substantially bridge the roller gap, so that the tape is compressed in this area when running through the roller gap. The radially outward-projecting nubs can be integrated into the roller surface of the first and/or the second roller. Each nub can form a punctiform excitation body to introduce energy, e.g., pressure or friction energy, selectively into the foil tape for welding. The punctiform or other welding of the non-woven fabrics or textiles lying on top of one another occurs in the roller gap.

The excitation body/bodies is/are preferably ultrasonic transmitters, so that the sections of the non-woven fabrics or textiles lying on top of one another are welded to one another partially and in particular in a punctiform pattern.

At least one of the rollers can be driven to rotate, for example by an electric motor with a controllable speed. The respectively other roller can be joined to the roller by way of a gear mechanism or have its own motor. If each of the rollers is driven by a separate motor, the motors can be synchronized with each other.

If the first roller and the second roller comprise the nubs referred to above, which are arranged in such a way that in the roller gap always a nub of the first roller is directly opposite a nub of the second roller, the first roller and the second roller can be driven to rotate separately or motion-coupled by a gear mechanism, for example a gear train. In other words: in this configuration the welding spots are always formed where the folded body is in contact with one of the nubs of the first roller on one side and with one of the nubs of the second roller on the opposite side. This means that the punctiform welding of the textiles lying on top of one another happens in the roller gap between a nub or several nubs of the first roller and a nub or several nubs of the second roller, which are located opposite each other in the roller gap. In this case a synchronization of the two rollers by way of a gear mechanism or the drive motors may be necessary.

The punctiform welding is preferably performed by ultrasonic welding (US). Numerous trials have shown that welding with ultrasound offers very good results. The weld is obtained using oscillations introduced into the parts to be joined, here the non-woven fabric or textile. The non-woven fabric or textile heats up and begins to melt, thereby increasing the damping coefficient. The increase of the damping coefficient leads to a higher internal friction, which further accelerates the temperature increase. The molten material of the non-woven fabric or textile bonds, and after the material has cooled and set, the non-woven fabric or textile layers are joined to each other.

The welding can also be performed by high-frequency welding (HF). In this case the welding spots can again be produced with two rollers, wherein the excitation body of the one roller is designed as punctiform electrodes connected to a source for an electric welding signal. The punctiform electrodes are integrated into the outer surface of an otherwise electrically insulating roller surface. These electrodes can be designed as nubs projecting from the outer surface or can be flush therewith. The source can be a DC or AC source, the signal a high-frequency signal in particular. The other roller can be designed to be electrically conductive, thus forming a counter-electrode to the welding electrodes. With a high-frequency signal of at least 10 MHz, plastics with functional polar groups can be heated and welded very well. For technical applications the frequency of 27.12 MHz is internationally cleared.

The intensity of the welding process can be adjusted by adjusting the welding energy (oscillation amplitude) and/or the rotating speed of the two rollers, for example. If the textile material, the adhesive of the adhesive layer or the thickness of at least one layer of the folded body changes, for example, readjustment is easy.

After the welding of the textiles, the foil tape or the folded body can be rolled up to form a roll in a further step. The roll of foil tape can then be stored and transported easily.

A second aspect of the invention relates to a foil tape for sealing joints between structural elements, for example in house-building between masonry and a window or doorjamb. The foil tape comprises:
(a) a functional membrane with a top side and an underside,
(b) a textile joined, preferably all-over, to a top side or an underside of the membrane,
(c) at least one adhesive layer applied at least in certain areas to that side of the membrane which is averted from the textile,
(d) optionally a cover foil covering the open surface of the adhesive layer.

The foil tape is characterized in that it is folded to form a folded body, so that in the interior of the folded body sections of the textile lie on top of one another at least in certain areas, wherein the sections of the textile lying on top of one another are welded partially and in particular in a punctiform pattern.

In the installation process such a foil tape can initially be attached to a first building body by the adhesive layer. By introducing a finger between the sections of the foil tape joined by welding and by water vapor diffusion coefficients changing with the surrounding atmospheric humidity. The membrane can, in particular substantially, consist of polyethylene, polyurethane, polyamide, polyethylene, polypropylene or PVC or comprise at least one of said materials. Such foils are known to the expert and covered by numerous patent literature, for example DE 10 2010 054 110 A1, WO9633321 A1, DE 10 2008 037 292 A1 and WO 2010/017947 A2, to which we refer in this context. Rubbing the finger along the foil tape breaks the joint between the two sections. As a result one of the two sections unfolds and can be joined to a second building body having to be sealed against the first building body by the adhesive layer located thereon.

Since the folded sections of the foil tape are reliably held together by the partial weld and the fold can be undone easily, the foil tape can very easily be installed in the region to be sealed initially in its folded state and then unfolded.

The punctiform weld allows a very simple release or break-up of the welded joint. This applies to a punctiform welded joint in particular. "Punctiform welding" does not mean that the weld is necessarily designed as a circular welding spot, but that the major part of the sections lying on top of one another is not welded and only comparatively small areas of the sections lying on top of one another are welded.

The membrane can be a functional membrane in particular, preferably a non-perforated foil. This may be a humidity-variable polymer foil with a water vapor diffusion coefficient that varies with the surrounding atmospheric humidity.

The membrane can in particular consist at least substantially of polyurethane, polyamide, polyethylene, polypropylene or PVC or comprise at least one of said materials. Such foils are known to the expert and covered by numerous patent literature, for example DE 10 2010 054 110 A1, WO9633321 A1, DE 10 2008 037 292 A1 and WO 2010/017947 A2, to which we refer in this context.

The membrane has a thickness of at least 10 μm, preferably at least 15 μm and particularly preferably at least 20 μm and a maximum thickness of 200 μm, preferably 150 μm and particularly preferably 100 μm.

The dimensions of the textile, in particular its length and width, substantially correspond to the dimensions of the membrane. The textile can be permanently joined, for example bonded, to the membrane. The membrane can be covered by the textile only on the top side or the underside, of both on the top side and on the underside. In this the textile covering the top side can be the same material as the textile covering the underside, but different textiles can also be used. The membrane together with the textile joined thereto has a thickness of at least 100 μm, preferably of at least 150 μm and particularly preferably of at least 250 μm and a maximum thickness of 500 μm, preferably 400 μm and particularly preferably 300 μm.

The adhesive layer can be a self-adhesive layer, i.e. an adhesive which maintains its adhesive properties at normal ambient temperature at least substantially for a longer time, e.g. days, weeks or months. Such an adhesive can have an expiry date from which it must no longer be used. The adhesive layer can, however, also be an adhesive with adhesive properties that have to be activated first. The adhesive preferably forms a self-adhesive layer, a self-adhesive area or a self-adhesive strip. The self-adhesive layer for example has a thickness of at least 50 μm, preferably at least 100 μm and particularly preferably at least 170 μm and a maximum thickness of 400 μm, preferably 300 μm and particularly preferably 270 μm.

The adhesive layer can form several adhesive areas of the foil tape which are not joined to one another. If there is an adhesive area within the fold area, it is preferred if the edge of the fold does not have any adhesive, so that the adhesive does not project laterally from the folded foil tape. The distance between adjacent adhesive areas, in particular in the fold area, is at least 2 mm or at least 3 mm and preferably at least 4 mm and particularly preferably at least 5 mm. The distance between adjacent adhesive areas, in particular in the fold area, is no more than 7 mm, preferably no more than 6 mm and particularly preferably no more than 5 mm. For special applications, however, distances between adjacent adhesive areas of less than 2 mm or 3 mm and more than 7 mm are not ruled out in principle.

A folded foil tape in which the edge of the fold (=folding edge) is formed without adhesive can, when installed in a corner region formed between a window frame and a wall soffit, be introduced and positioned accurately in the corner of said corner region with its adhesive-less edge. If the edge were provided with adhesive, there would be a risk that it comes into contact with the wall soffit or with the window and adheres there before being completely introduced into the corner. The adhesive-less edge thus allows a simple, secure and precise positioning of the foil tape in a corner region. This adhesive-less edge represents an independent inventive idea, which can be used independently of the punctiform joining of the textile sections lying on top of one another.

If the adhesive layer is a self-adhesive layer, it can be covered with a cover foil at least in certain areas to protect the adhesive layer against drying-out or contamination and/ or unwanted adhesion of the foil tape to an object during storage and transport. In addition the unrolling of the foil tape from a reel can be made easier in this way. The cover foil has a thickness of at least 40 μm, preferably at least 50 μm and particularly preferably at least 60 μm and a maximum thickness of 120 μm, preferably 100 μm and particularly preferably 80 μm.

The fact that only two textiles lying directly on top of one another are joined by welding in the welding process means that the material of all other layers of the folded body may be heated locally, but not enough to induce a material bond with an adjoining layer. The energy input is preferably so low that the properties of the adhesive layer(s) remain unchanged.

A system in which the method described in the first aspect can be carried out can have at least one roll holder capable of accommodating at least one roll of membrane which is preferably already cut to a final width of the foil tape. In the system the membrane can be placed manually, semi-automatically or automatically in a conveying device which moves the membrane through the system.

On the way through the system the membrane can be sprayed with an adhesive and then joined to a textile fed from a second roll holder in a press-on device, for example two rollers forming a roller gap. It is also possible that the textile runs into the system first and is sprayed with the adhesive, and the membrane is introduced in the system. The membrane or the textile can also already have an adhesive layer which is activated in the system, for example by an energy supply, in order to join the membrane to the textile. After joining, the adhesive layer can be applied to one side or both sides of the membrane and/or the textile and covered with a cover foil.

The still flat foil tape can then run through a folding device, where at least one outer edge section of the tape, as viewed on the longitudinal direction of the tape, is folded towards the center of the tape, so that the areas with textile lie on top of each other.

After completion of the folding the folded body can be moved through a welding device where, preferably by ultrasonic welding, the two textiles are subjected to punctiform welding only in an area where they are directly adjacent to one another—lying on top of one another. The welding device can in particular be the ultrasonic welding system described below with the two rollers or wheels. In the welding device the first or the second wheel—preferably as a whole—can be made to oscillate in the ultrasonic range, for example, while the other wheel serves as an anvil. The first and the second wheel can consist of metal, for example of steel.

After welding the folded body can be rolled up and cut to length by means of a cutting device. The length of the foil tape in the form of a folded body on a reel can be at least 20 m or at least 25 m or at least 30 m or any length, for example.

The completed foil tape rolls can then be packaged and deposited in a store or prepared for shipping.

Each feature described in the first aspect or the second aspect can—mutatis mutandis—be used in the respectively other aspect as well or further develop the subject matter in an advantageous manner if this is sensible.

The invention is explained in greater detail below with reference to figures. The figures only show preferred variants of the invention, but do not restrict the invention to the illustrated embodiment. Features essential to the invention which can only be derived from the figures fall into the scope of the disclosure and can provide an advantageous further development of the method according to claim 1 or the object according to claim 10.

THE FIGURES SHOW IN DETAIL

FIG. 1A an exemplary embodiment of a foil tape before folding and welding.

Figure 1B:
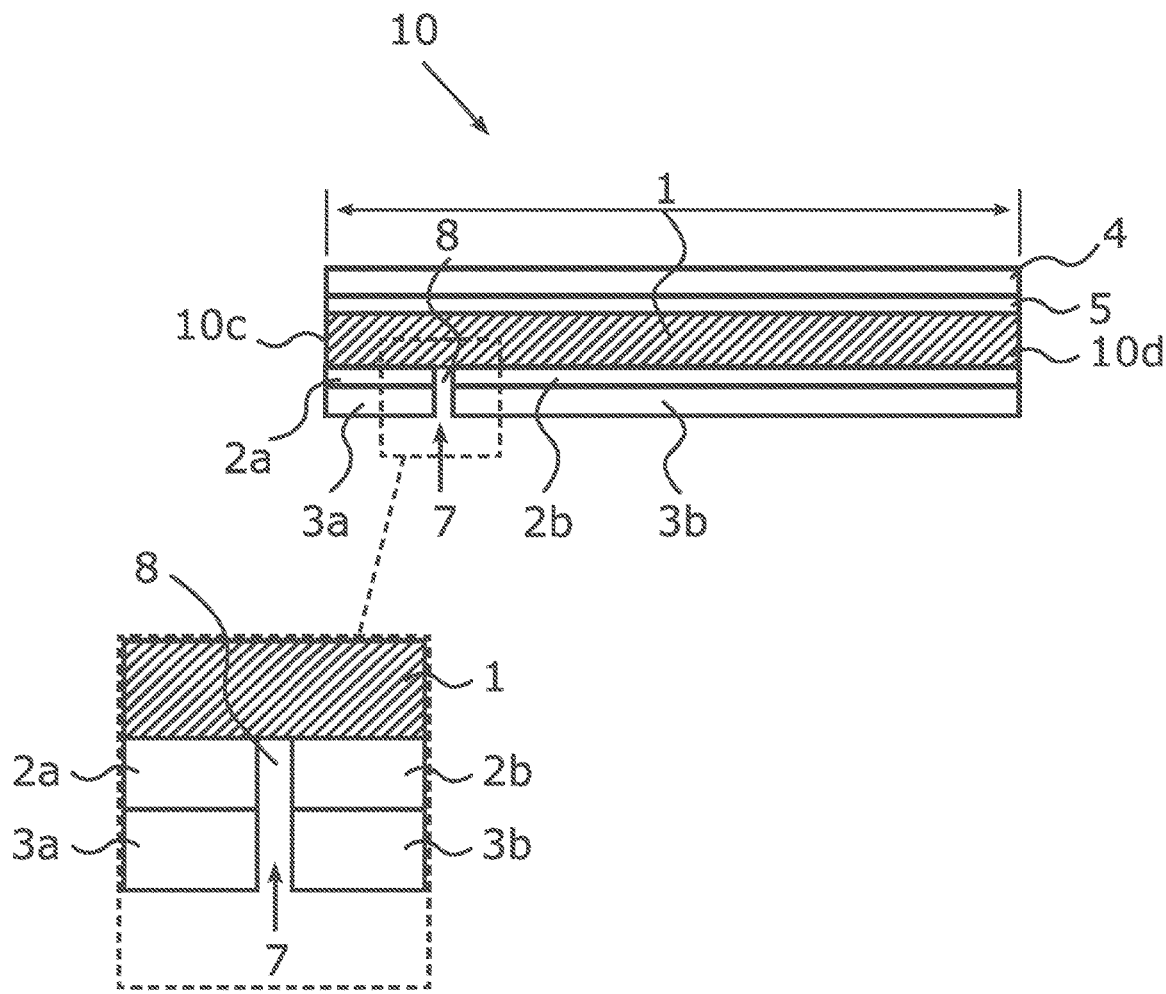

FIG. 1B an exemplary embodiment of a foil tape before folding and welding.

Figure 2:
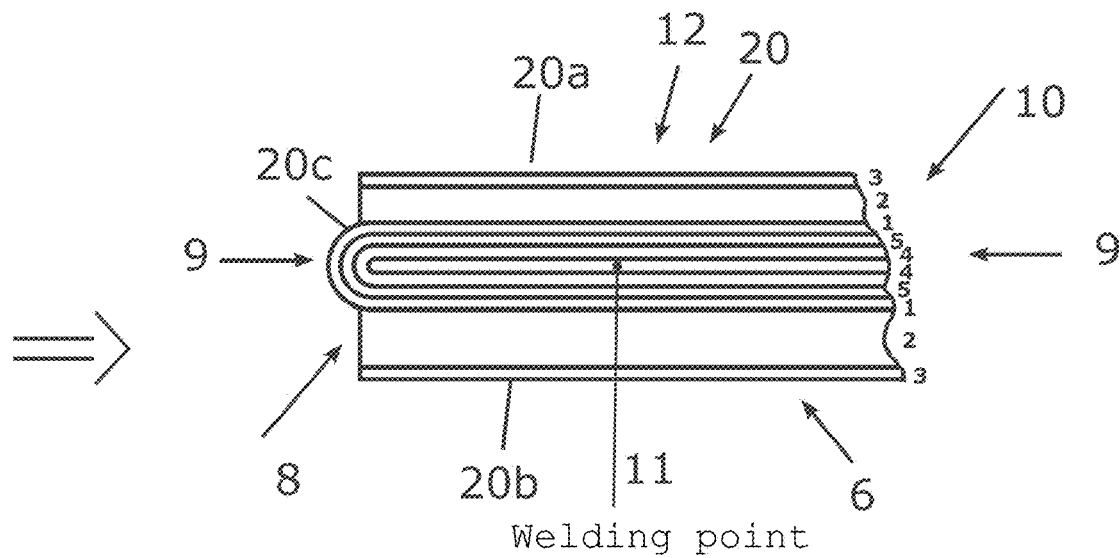

FIG. 2 a foil tape as a folded body with weld, section.

Figure 3:
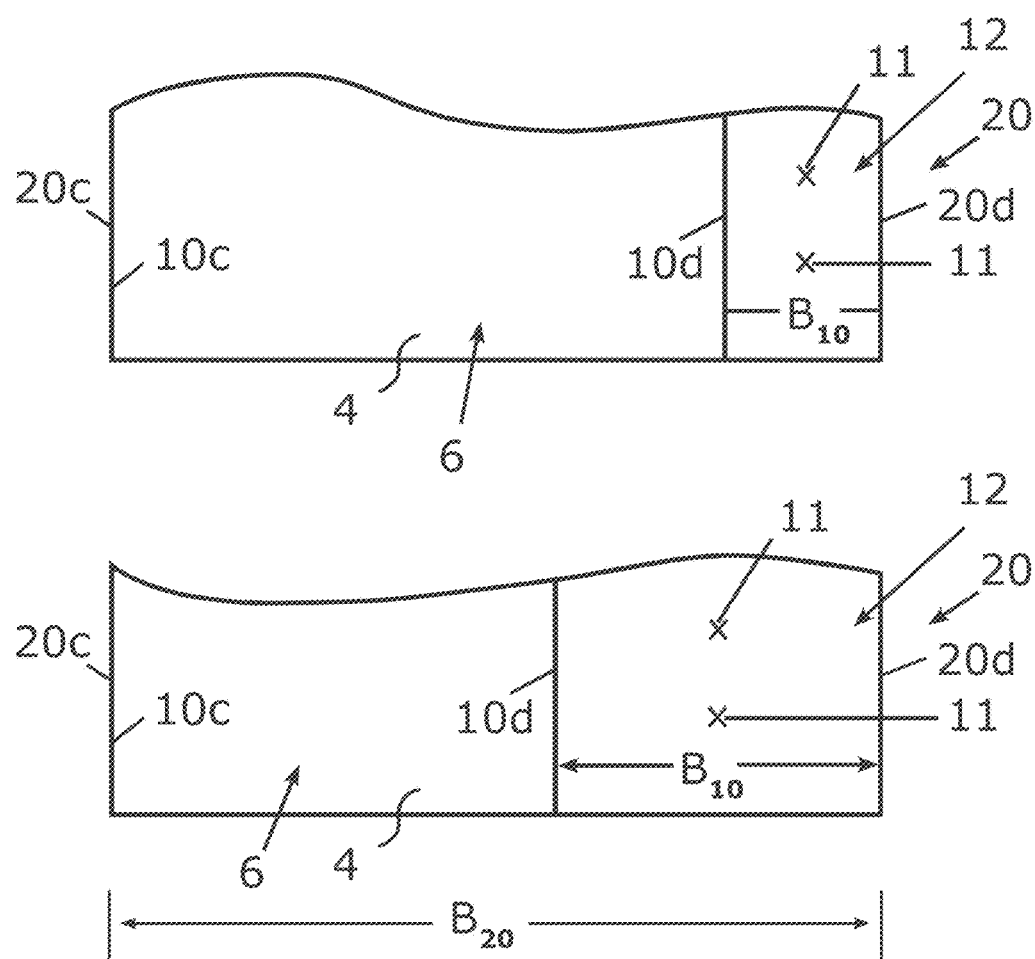

FIG. 3 a folded body from above, with adjacent folding sketch.

Figure 4:
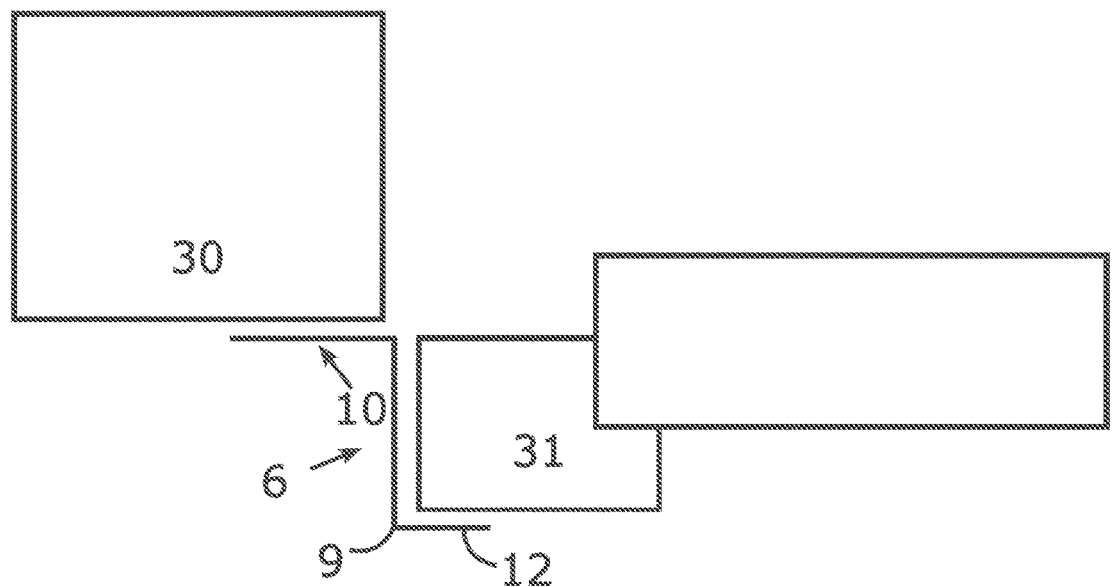
Figure 4:
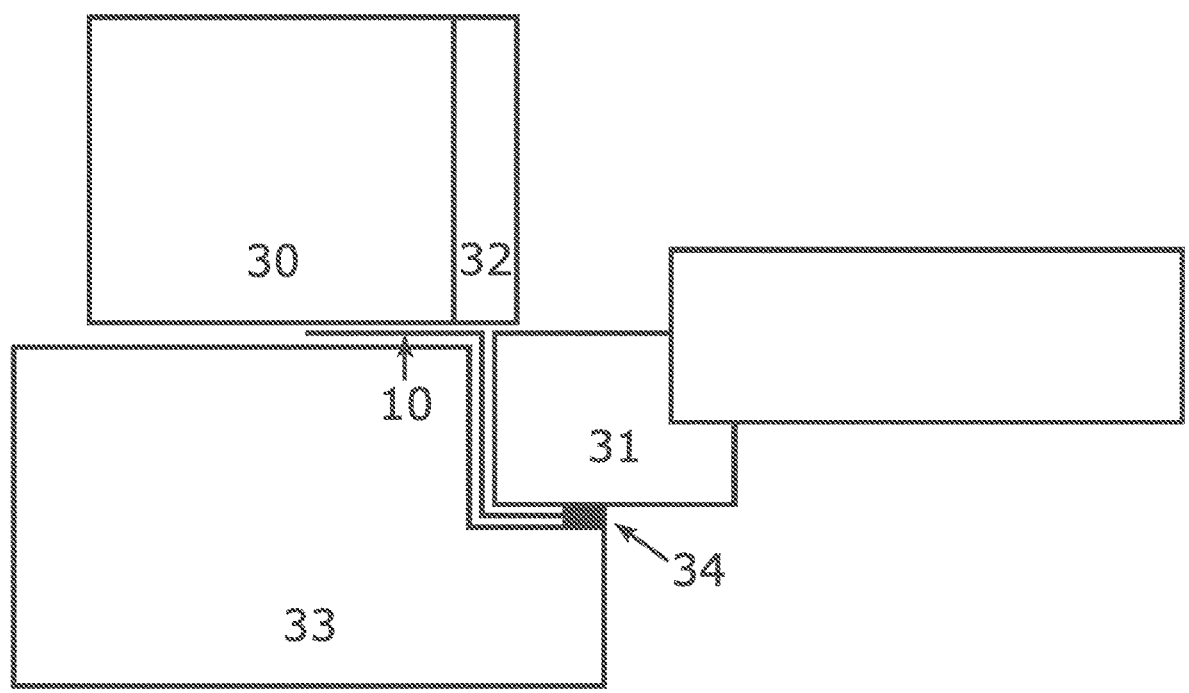

FIG. 4 joint sealing with a foil tape in a first and a second building phase.

Figure 5:
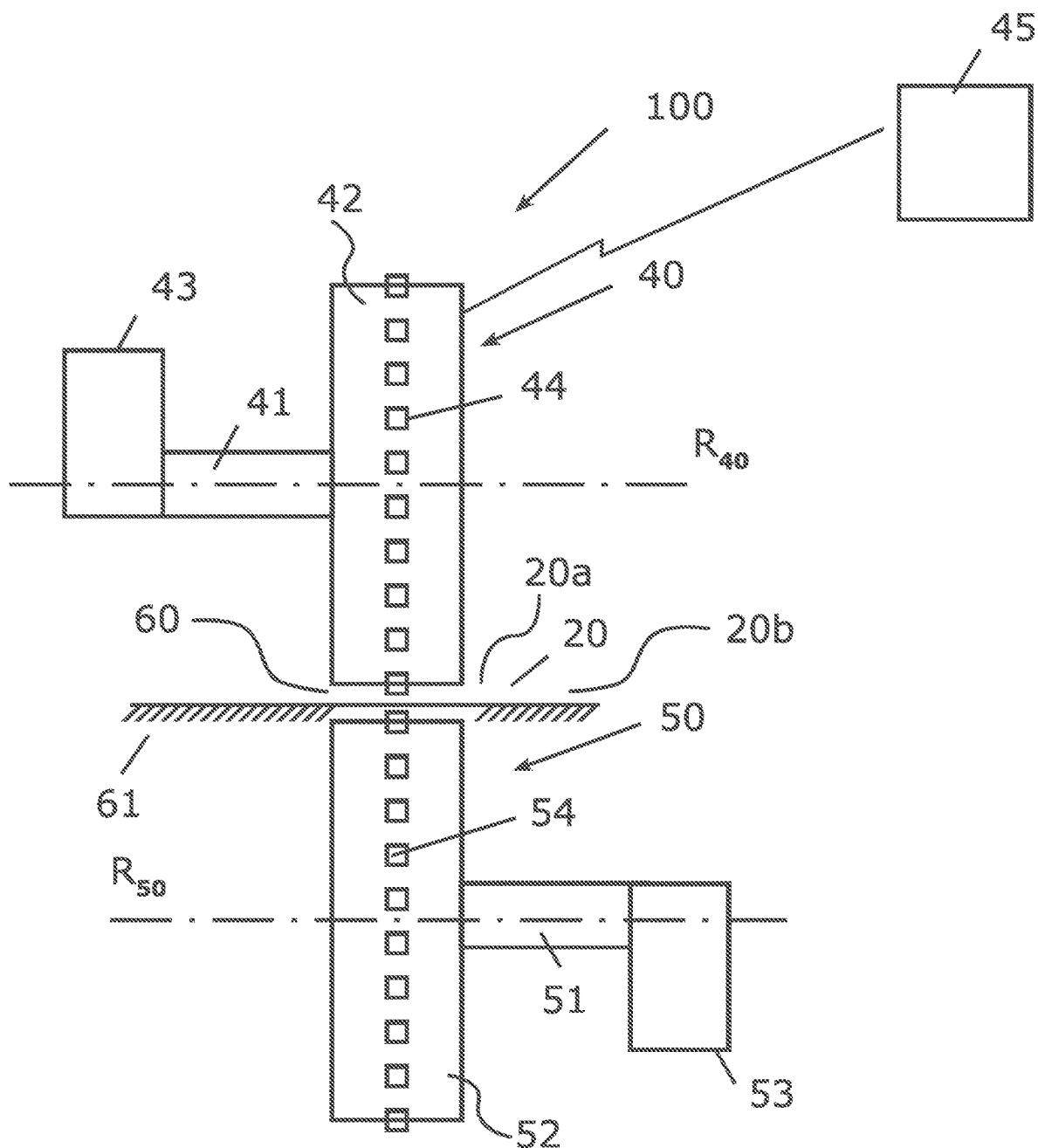

FIG. 5 a diagrammatic representation of a welding device for producing the welds of the folded body.

Figure 6A:
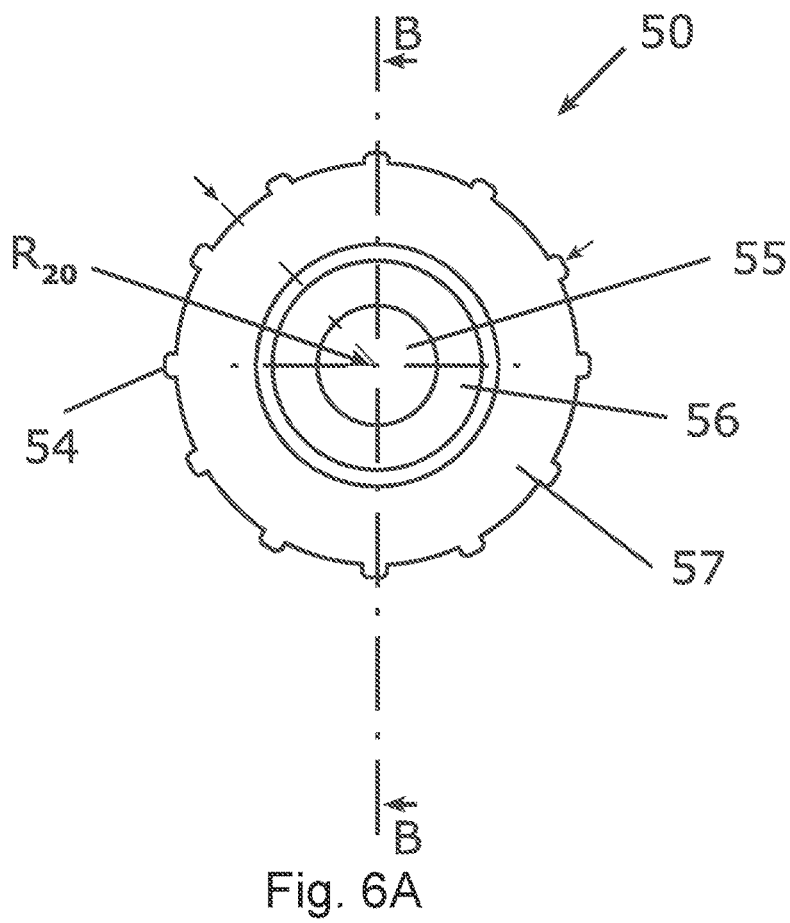

FIG. 6A a detailed view of a roller for welding.

Figures 6B, 6C:
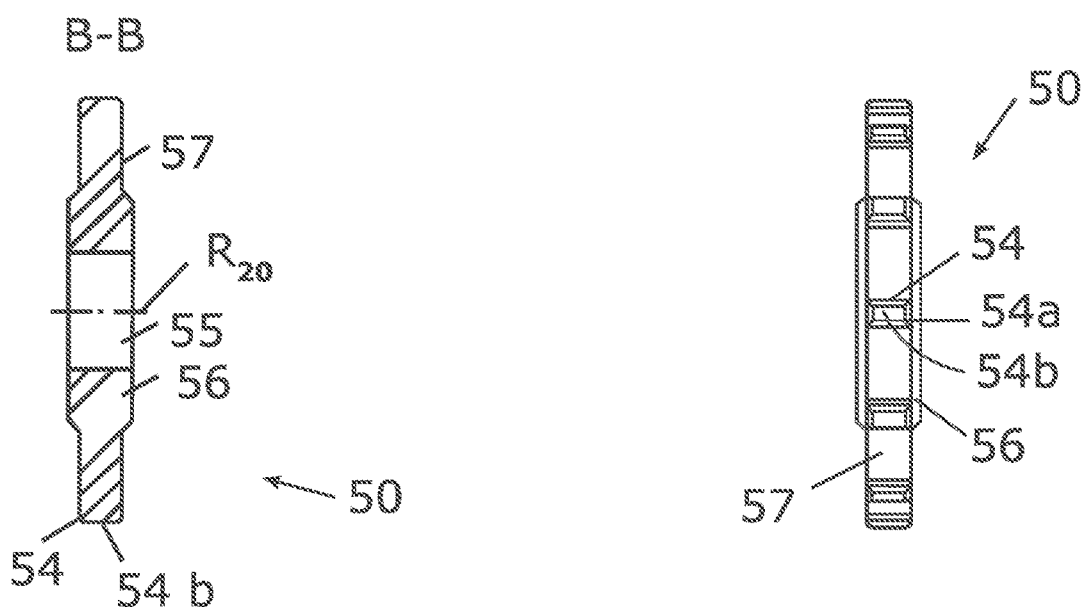

FIG. 6B a detailed view of a roller for welding.

FIG. 6C a detailed view of a roller for welding.

FIG. 1A shows the basic structure of a foil tape 10 after the joining of several tape layers and before the subsequent folding and welding. A sectional view transverse to the longitudinal axis of the foil tape 10 is also presented.

The foil tape 10 comprises a membrane or functional membrane 1, a self-adhesive layer 2 protected against contamination and damage by a removable cover foil 3 and a textile 4 joined by means of an adhesive 5, preferably non-releasably, to the membrane 1 on that side of the membrane 1 which is averted from the self-adhesive layer 2.

In the present embodiment the textile is preferably a non-woven fabric. The textile 4 can be a needle felt, a water structure fabric, a spunbond non-woven fabric or a closed non-woven fabric, preferably of polyethylene, polyester, polypropylene or polyamide.

The tape width B of the prototype produced by the applicant is 75 mm, 80 mm or 250 mm. These prototypes thus form three embodiments having the same structure, but different widths B. The foil tape can also have a different width, however, as required for sealing a gap between two structural elements. It is therefore expedient to provide a width of at least 50 mm, in particular at least 75 mm.

As will be described in greater detail below, at least one longitudinal side of the tape 10 is folded. This results in a base section 6 and a folded section 12, the base section being wider than the folded section. The width of the folded section can differ, being for example 12 mm in the embodiment with the tape width B of 75 mm, 12 mm or 20 mm in the embodiment with the tape width B of 80 mm and 12 mm or 20 mm in the embodiment with the tape width B of 250 mm. It has been shown that the width of the folded section is preferably at least 10 mm to obtain a sufficiently strong adhesion to a second building part to be sealed.

The foil tape 10 shown in FIG. 1Bb has the structure shown in FIG. 1A, with the difference that the foil tape is prepared for folding. The cover foil 3 is divided into two sections 3*a*, 3*b*, which can be removed individually from the adhesive layer 2. In the illustrated embodiment the cover foil 3 is perforated to produce the two sections 3*a*, 3*b*, with a perforation line 7 facilitating the removal of the sections 3*a*, 3*b* of the cover foil 3 in certain areas.

The adhesive layer 2 is formed in two separate adhesive areas 2a, 2b, which are spaced from each other to form an adhesive-free area 8. The division of the adhesive layer 2 into the two adhesive areas 2a, 2b facilitates a folding of the foil tape 10 to produce a folded body 20 (see FIG. 2). In the folding process the cover foil 3 is torn into two sections along the perforation line 7, so that the sections 3a, 3b form separate sections.

The adhesive layer 2 and/or the cover foil 3 can also be applied after folding.

It is particularly advantageous if no cover foil is applied to the adhesive area 2a, because when the foil tape 10 is then wound onto a reel, the area 2a of the adhesive layer 2 contacts and adheres to the section 3b of the cover foil 3 of the adjacent wrap of the foil tape 10.

The foil tape 10 is preferably folded in a region where no adhesive layer 2 is joined to the membrane 1, which has the advantage that there is no adhesive layer 2 at the side of the folded foil tape 10.

The folded foil tape (FIG. 2) has a fold 9 of a folded body 20 formed from a foil tape 10. In the region of the fold 9, an outer surface 20c of the folded body 20 is free of adhesive.

The foil tape 10 has the adhesive layer 2 on only one side of the membrane 1. The foil tape 10 is folded in such a way that the adhesive layer 2 and the cover foil 3 respectively lie outside at the folded body 20 on a top side 20a and an underside 20b and the textile 4 forms a double layer in the interior of the folded body 20.

By supplying energy, the sections of the textile 4 which lie on top of one another are at least partially melted and joined to one another in welding spots 11 after cooling, which will be explained in greater detail below. The joint in the welding spots 11 is strong enough to prevent an unwanted unfolding of the folded body 20. The joint of the textile 4 in the welding spots 11 can easily be undone manually or with a tool, however.

FIG. 3 is a top view of two folded bodies 20 which can be produced by folding the foil tape 10 of FIG. 1A or 1B. The folded bodies 20 differ in the width B10 of the folded section 12. In the upper view B10 is 12 mm, for example, and in the lower view B10 is 20 mm. In principle B10 can be any size to be determined by the expert. The base sections 6 of the two folded bodies in FIG. 3 have the same width B20.

The base sections 6 of the folded bodies 20 have an outer free edge 20c identical to the outer edge 10c of the foil tape 10 and form an outer edge 20d with the fold 9. The folded section 10 has a free edge coinciding with the outer edge 10d of the foil tape 10.

FIG. 4 shows the installation situation of the foil tape 10 between a first structural body 30, e.g. an opening in the outer wall of a building, and a second structural body 31, e.g. a window or doorjamb, in a first building phase (upper sketch) and a second building phase (lower sketch).

In the first building phase the foil tape 10 serves as outer seal of the joint formed between the first structural body 30 and the second structural body 31, so that the interior of the building or house can dry out. During and after the second building phase (lower sketch), the same foil tape 10 provides an inner seal of the joint between the first structural body 30 and the second structural body 31. In the second building phase a composite heat insulation system 33 with its own seal 34 can be joined to the first structural body 30 and the second structural body 31, for example, and the first structural element 30 can receive a plaster layer 32.

In the installation process the foil tape 10 can be placed with its fold 9 flush with an edge 35 of the structural body 31 and joined to the first and second structural bodies 30, 31. The folded section 12 of the foil tape 10 is then detached from the base section 6 and laid around the edge 35 and joined to a further side of the second structural body 31. This makes the installation of the foil tape 10 very simple, and the installation is easy even with a Z-arrangement of the self-adhesive foil tape 10 as shown in a top view.

In the above embodiment the foil tape has only one folded section 12. Within the scope of the invention the foil tape can also be designed with two folded sections 12 on the two longitudinal sides.

FIG. 5 shows a sketch of an example of a welding device 100, with which the textile 4 of the folded adhesive foil 10 can be welded as described above. The welding device 100 comprises a first wheel or a first roller 40 and a second wheel or a second roller 50.

The first roller 40 can have a circular circumference and is preferably made completely of metal, e.g. steel, titanium or aluminum. The first roller 40 comprises a drive shaft 41 non-rotatably joined to the first roller 40. In the illustrated embodiment the first roller 40 is driven by an electric motor 43. The surface 42 of the first roller 40 is connected to an energy source 45, e.g. an ultrasonic generator applying ultrasound to the first roller or an AC generator capable of applying an electric voltage to the surface 42. If the energy source 45 is an ultrasonic generator, the first roller 40 is preferably designed as a sonotrode, made to perform resonant vibrations by the introduction of the ultrasonic waves.

The surface 42 of the first roller 40 can be substantially smooth or have, as shown in the illustrated embodiment, radially projecting nubs distributed along the outer circumference of the first roller 40. Such nubs are particularly advantageous when using ultrasound. When using electromagnetic waves, electrodes are provided at the locations of the nubs; these can be flush with the surface of the roller 40 or project from the surface like the nubs. The electrodes are electrically insulated against the remaining outer surface of the rollers.

The second roller 50 has a circular circumference and can be made of or comprise steel or another metal like the first roller. The second roller 50 comprises a drive shaft 51 non-rotatably joined to the second roller 50. In the illustrated embodiment the second roller 50 is driven by a second electric motor 53. The surface 52 of the second roller 50 has a plurality of nubs 54 projecting outwards in the radial direction from the surface 52 of the second roller 50.

The first roller 40 and the second roller 50 are arranged adjacent to each other, their axes of rotation R40 and R50 being parallel to each other. The first roller 40 and the second roller 50 together form a roller gap 60. The roller gap 60 is located directly above a locating surface 61 for the folded foil tape 10, which means that either the first roller 40 or the second roller 50 is placed largely or substantially below the locating surface 61.

The welding spots 11 in the folded foil tape 10 or folded body 20 are formed where the folded body 20 running through the roller gap 60 is pushed downwards towards the second roller 50 on its top side 20a by the first roller 40 or a nub 44 of the first roller and at the same time upwards against the first roller 40 on the underside 20b by a nub 54 of the second roller 50.

In the preferred ultrasonic welding process, the second roller 50 can here form the anvil 50 and the first roller 40 can form the sonotrode 40 made to vibrate in the ultrasonic range. The friction generated by the sonotrode 40 at least starts to melt the textile 4 in the region of the top sides averted from the membrane 1, so that the facing sides of the textiles 4 lying adjacent to one another adhere to one another. In this the number and arrangement of the nubs 54 on the second roller 50 or the anvil 50 determines the arrangement and number of the welding spots 11 in the folded body 20 if the first roller 40 has a smooth surface.

If the first roller 40 has nubs 44 and the second roller 50 has nubs 54, and an outer diameter of the two rollers 40, 50 as measured at the radially outer ends of the nubs 44, 54 is identical, the number and arrangement of the nubs 44 on the first roller can correspond to the number and arrangement of the nubs 54 on the second roller 50. In order to facilitate a regular secure production of welding spots 11 in the folded body 20, the two rollers 40, 50 have to be synchronized. In the illustrated embodiment the synchronization is performed by the electric motors 43 and 53.

With regard to the welding device 100 of FIG. 5, the fact applies that only an example has been described here and the expert knows numerous alternatives having a similar effect. With regard to the welding device 100, the invention is not restricted to the illustrated and described welding device 100.

FIGS. 6A, 6B, and 6C offer a detailed representation of the second roller 50—the anvil wheel—in four views. The first view, shown in FIG. 6A, is a lateral top view of the second roller 50. The anvil wheel comprises a central opening 55, which can be connected to the drive shaft 51 driven by the motor 54. In the radial direction the central opening 55 is adjoined by an annular roller base body 56. The roller base body 56 supports the roller head 57 with the radially outward-projecting nubs 54 or embossing nubs.

FIG. 6B shows a central cross-section B-B through the anvil wheel or second roller 50 of FIG. 6A in a plane spanned by the axis of rotation R50 of the anvil wheel. It shows the axis of rotation R50, the opening 55 for the accommodation of a shaft (not shown) which can drive the anvil wheel, the roller base body 56 and the roller head 57. The illustrated anvil wheel is formed in one piece, i.e. cast, sintered or machined from a solid material. The material of the second roller 50 is a metal such as steel.

FIG. 6C is a side view of the second roller 50. As can be seen, the ends of the nubs 54 averted from the roller head 57, where the second roller 50 has a maximum diameter, as can be seen in FIG. 6A in the section B-B, are quadrangular with edges 54a extending obliquely outwards all round. This means that the surface 54b, which presses in a punctiform manner against the folded body 20 in the welding process and interacts with the sonotrode 40, is formed in such a way that force can be transmitted optimally.

LIST OF REFERENCE SYMBOLS

1 Membrane, functional membrane
2 Adhesive layer
2a Adhesive area
2b Adhesive area
2c Adhesive area
3 Cover foil
3a Cover foil area
3b Cover foil area
3c Cover foil area
4 Textile
5 Adhesive
6 Base section
7 Perforation line
8 Adhesive-free area
9 Fold
10 Foil tape
10a Top side
10b Underside
10c Outer edge
10d Outer edge
11 Welding spot
12 Folded section
20 Folded body
20a Top side
20b Underside
20c Fold
20d Outer end
40 Roller
41 Drive shaft
42 Surface
43 Motor
44 Nub
45 Energy source
50 Roller

The invention claimed is:

1. A method of manufacturing a welded foil tape for sealing joints between two structural elements, the method comprising the steps of:
   a) providing a tape-like membrane;
   b) providing a tape-like textile;
   c) joining the tape-like textile to the tape-like membrane;
   d) applying an adhesive layer to a side of the tape-like membrane facing away from the tape-like textile to form a foil tape;
   e) folding the foil tape along a longitudinal axis to form a folded body, so that the adhesive layer is present on an outside of the folded body, and wherein sections of the tape-like textile lie on top of one another in the interior of the folded body;
   f) joining the sections of the tape-like textile lying on top of one another, so that the sections of the tape-like textile lying on top of one another are joined partially; wherein the sections of the tape-like textile lying on top of one another are joined by supplying energy to the folded body, so that the sections of the tape-like textile lying on top of one another are welded partially and in a punctiform pattern to produce the welded foil tape.

2. The method according to claim 1, further comprising winding the welded foil tape.

3. The method according to claim 1, further comprising covering the adhesive layer with a cover foil.

4. The method according to claim 1, wherein the tape-like textile is a non-woven fabric.

5. The method according to claim 1, further comprising using the welded foil tape in house-building.

6. The method according to claim 1, further comprising using the welded foil tape between masonry and a door or window jamb.

7. A method of manufacturing a welded foil tape for sealing joints between two structural elements, the method comprising the steps of:
   a) providing a tape-like membrane;
   b) providing a tape-like textile;
   c) joining the tape-like textile to the tape-like membrane;
   d) applying an adhesive layer to a side of the tape-like membrane facing away from the tape-like textile to form a foil tape;
   e) folding the foil tape along a longitudinal axis to form a folded body, so that the adhesive layer is present on an outside of the folded body, and wherein sections of the tape-Vice textile lie on top of one another in the interior of the folded body;

f) joining the sections of the tape-like textile lying on top of one another, so that the sections of the tape-like textile lying on top of one another are joined partially;

g) guiding the folded body through a roller gap formed between two rollers rotating parallel, wherein a first roller of the two rollers has a plurality of nubs integrated into the roller surface or projecting from the roller surface, wherein each of the plurality of nubs forms a punctiform excitation body to introduce punctiform energy for welding into the folded body while being guided through the roller gap.

8. The method according to claim 7,
wherein the punctiform excitation bodies are ultrasonic transmitters, and the welding occurs in a punctiform pattern.

9. The method according to claim 7,
wherein the punctiform excitation bodies are punctiform electrodes connected to a source for an electric welding signal and a second roller of the two rollers is designed to be electrically conductive, thus forming a counter-electrode.

10. The method according to claim 9, wherein, during welding, a voltage applied to the punctiform electrodes or a rotary speed of at least one of the two rollers, can be changed.

11. A method of manufacturing a welded foil tape for sealing joints between two structural elements, the method comprising the steps of:

a) providing a tape-like membrane;
b) providing a tape-like textile;
c) joining the tape-like textile to the tape-like membrane;
d) applying an adhesive layer to a side of the tape-like membrane facing away the tape-like textile to form a foil tape;
e) folding the foil tape along a longitudinal axis to form a folded body, so that the adhesive layer is present on an outside of the folded body, and wherein sections of the tape-Vice textile lie on top of one another in the interior of the folded body;
f) joining the sections of the tape-like textile lying on top of one another, so that the sections of the tape-like textile lying on top of one another are joined partially;
wherein joining is punctiform and is performed by ultrasonic or high-frequency welding to produce the welded foil tape.

12. The method according to claim 11, wherein, during welding, a voltage applied to the punctiform electrodes or a rotary speed of at least one of the two rollers, can be changed.

13. The method according to claim 11, further comprising winding the welded foil tape.

14. The method according to claim 11, further comprising covering the adhesive layer with a cover foil.

15. The method according to claim 11, wherein the tape-like textile is a non-woven fabric.

* * * * *